United States Patent
Katoh et al.

[11] Patent Number: 5,984,035
[45] Date of Patent: Nov. 16, 1999

[54] COOLING DEVICE FOR MOTORCYCLES

[75] Inventors: Yuichi Katoh; Naoki Urano; Hikaru Tsukamoto, all of Wako, Japan

[73] Assignee: Honda Giken Kogyo Kabushiki Kaisha, Tokyo, Japan

[21] Appl. No.: 08/820,890

[22] Filed: Mar. 19, 1997

[30] Foreign Application Priority Data

Mar. 19, 1996 [JP] Japan .................................. 8-063491

[51] Int. Cl.$^6$ ............................................... B60K 11/04
[52] U.S. Cl. .......................................... 180/68.1; 180/229
[58] Field of Search ................................ 180/68.1, 68.2, 180/68.4, 68.6, 229; 165/149; 293/115; 454/148, 277, 284

[56] References Cited

U.S. PATENT DOCUMENTS

| | | | |
|---|---|---|---|
| 4,019,595 | 4/1977 | Imai et al. ................................ | 180/229 |
| 4,169,501 | 10/1979 | Takeuchi et al. ....................... | 180/68.6 |
| 4,660,624 | 4/1987 | Yamaguchi ............................ | 180/68.4 |
| 5,715,904 | 2/1998 | Takahashi et al. ..................... | 180/68.1 |

FOREIGN PATENT DOCUMENTS

| | | | |
|---|---|---|---|
| 4001447 | 12/1990 | Germany ............................... | 180/68.1 |
| 58-89422 | 5/1983 | Japan ..................................... | 180/229 |
| 58-177717 | 10/1983 | Japan ..................................... | 180/68.1 |
| 1-289780 | 11/1989 | Japan ..................................... | 180/229 |
| 1-306383 | 12/1989 | Japan ..................................... | 180/229 |
| 3-193584 | 8/1991 | Japan ..................................... | 180/68.1 |
| 3-204384 | 9/1991 | Japan ..................................... | 180/68.1 |

*Primary Examiner*—J. J. Swann
*Assistant Examiner*—Frank Vanaman

[57] ABSTRACT

A radiator grille is provided between the radiator and the front fender without elongating the wheel base of the motorcycle. The radiator grille includes a plurality of vertically long louvers. The forward projecting distance of the louvers is shorter for louvers near the body center and longer for louvers further away from the body center. As a result, the forward ends of the louvers are located outside the rotation locus inscribed by the rear of the front fender. Furthermore, the inclination angle formed between the louver and a vertical reference line is larger for outer louvers than for inner louvers.

20 Claims, 13 Drawing Sheets

COOLING DEVICE FOR MOTORCYCLES

BACKGROUND OF THE INVENTION

1. Technical Field of the Invention

This invention relates to a cooling device for a motorcycle. More particularly, this invention relates to an improved radiator grille structure for a motorcycle.

2. Description of Related Art

Japanese Patent Laid-open No. Hei 5-69756 is an example of a conventional cooling device for a motorcycle in which a pair of right and left radiators are separately provided behind a front fender. The radiators are provided on both sides of a front tube member and extend in a backward and downward direction.

Japanese patent '756 also shows a conventional radiator grille structure including a plurality of vertically long louvers that are provided in front of the radiators. These louvers are inwardly inclined. Furthermore, the inwardly inclined inclination angle is the same for each louver.

Neither radiator nor radiator grille are provided near the body center line in conventional grille structures such as the '756 patent. As shown in the side view of the '756 patent, the front fender is positioned wholly in front of the radiator grille so as not to interfere with the grille.

Conventionally, a space is required between the rear of the front fender and the radiator grille so that the radiator grille does not interfere the front fender when the front fender is rotated along with the front wheel during a turn. This space increases the wheel base of the motorcycle.

If a single-piece (monolithic) radiator is utilized to cool the motorcycle, then the wheel base must also be increased to accommodate the radiator and grille. Such conventional, single-piece radiators are typically supported between right and left front tube members and have a monolithic structure in the width direction. Because of the monolithic structure, the center portion of the radiator could interfere with the rear of the front fender. To avoid this interference, the wheel base is typically increased to provide a clearance space. Furthermore, if a radiator grille is provided, the wheel base must be further increased to prevent interference between the rear of the front fender and the radiator grille.

Such increases in wheel base are undesirable. A long wheel base reduces the agility and maneuverability of the motorcycle and generally increases the overall weight.

SUMMARY OF THE INVENTION

To solve the above-mentioned problems in conventional cooling structures, this invention is directed to a cooling device in which a radiator and radiator grille are provided behind a rotatable front fender wherein the radiator grille includes a plurality of louvers forwardly projecting from the radiator, wherein the extent of the forward louver projection is designed so as to be located just outside of the rotation locus of the front fender.

The radiator has a monolithic structure in the lateral direction of the motorcycle and is supported in front of the front tube members and symmetrically aligned in the right-left direction.

Moreover, the respective louvers which are part of the radiator grille have a vertically long structure wherein the forward projection distance of the louvers from the radiator is larger for outboard louvers than for inboard louvers.

In addition, the respective louvers are outwardly inclined from the radiator. Still further, the inclination angle of the louvers is larger for outboard louvers than for inboard louvers.

Further, the forwards ends of the respective louvers may be arranged in a circular arc and outside of the rotation locus of the front fender.

When viewed from the side with no turning of the front wheel, the rear of the front fender appears to overlap with the radiator grille.

The forward projecting length of the respective louvers may be increased in a continuous fashion such that the projection length is longer as the distance of the respective louvre from the center line increases.

Still further, the inclination angle of the respective louvers may be continuously increased as the distance of the respective louver from the center line increases.

The forward projection of the radiator grille is controlled so that the front of the radiator grille is located outside of the rotation area of the fender.

Accordingly, the radiator grille does not interfere with the front fender even when the front fender is rotated. As a result, the front fender can be located as close as possible to the radiator and has the effect that the rear of the front fender appears to overlap with the radiator grille when viewed from the side.

Therefore, it is not necessary to use a longer wheel base as in the conventional art even if the radiator grille is provided. Furthermore, the increased ventilating effect of the radiator grille is very effective and the splashing of mud from the front wheel is prevented by using the louvered radiator grille of the invention.

Even if the radiator has a monolithic structure extending across the lateral direction of the motorcycle, the use of a longer wheel base to accommodate the radiator as in the conventional art is not necessary with the inventive radiator grille structure.

Further, by providing the vertically long louvers in the radiator grille and shortening the forwardly projecting ends of the louvers for the inboard louvers, the influence of the radiator grille on the wheel base is minimized while improving airflow through the radiator and preventing mud from splashing onto the radiator.

In addition, the respective louvers are outwardly inclined and the inclination angle is increased for outboard louvers with respect to inboard louvers. Thus, the quantity of air intake from the side can be increased to further enhance the ventilation effect.

Still further, the forward ends of the respective louvers may be arranged along a circular arc outside of the rotation locus inscribed by the front fender, thereby making the ventilation more effective while preventing interference with the front fender.

In this case, the forward projecting length of the louvers may be continuously made longer for outboard louvers with respect to inboard louvers. Independently or in combination therewith, the inclination angle of the louvers with respect to a vertical reference line may be continuously increased for outboard louvers with respect to inboard louvers thereby further improving the ventilation effect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
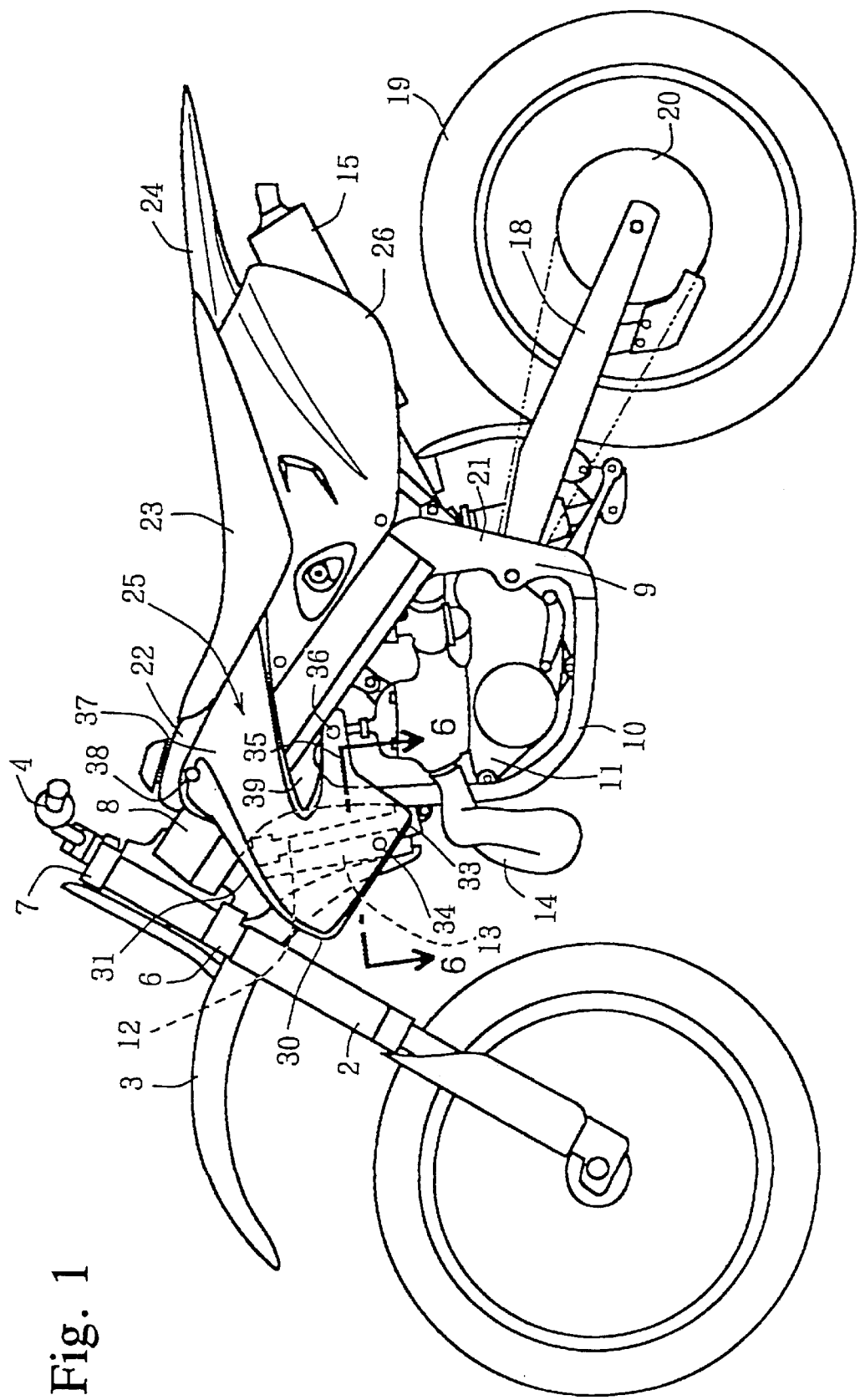
FIG. 1 is a side view of a motorcycle in accordance with the present invention.

FIG. 1 generally shows a motorcycle which incorporates the radiator and radiator grill structure of the invention.

Figure 2:
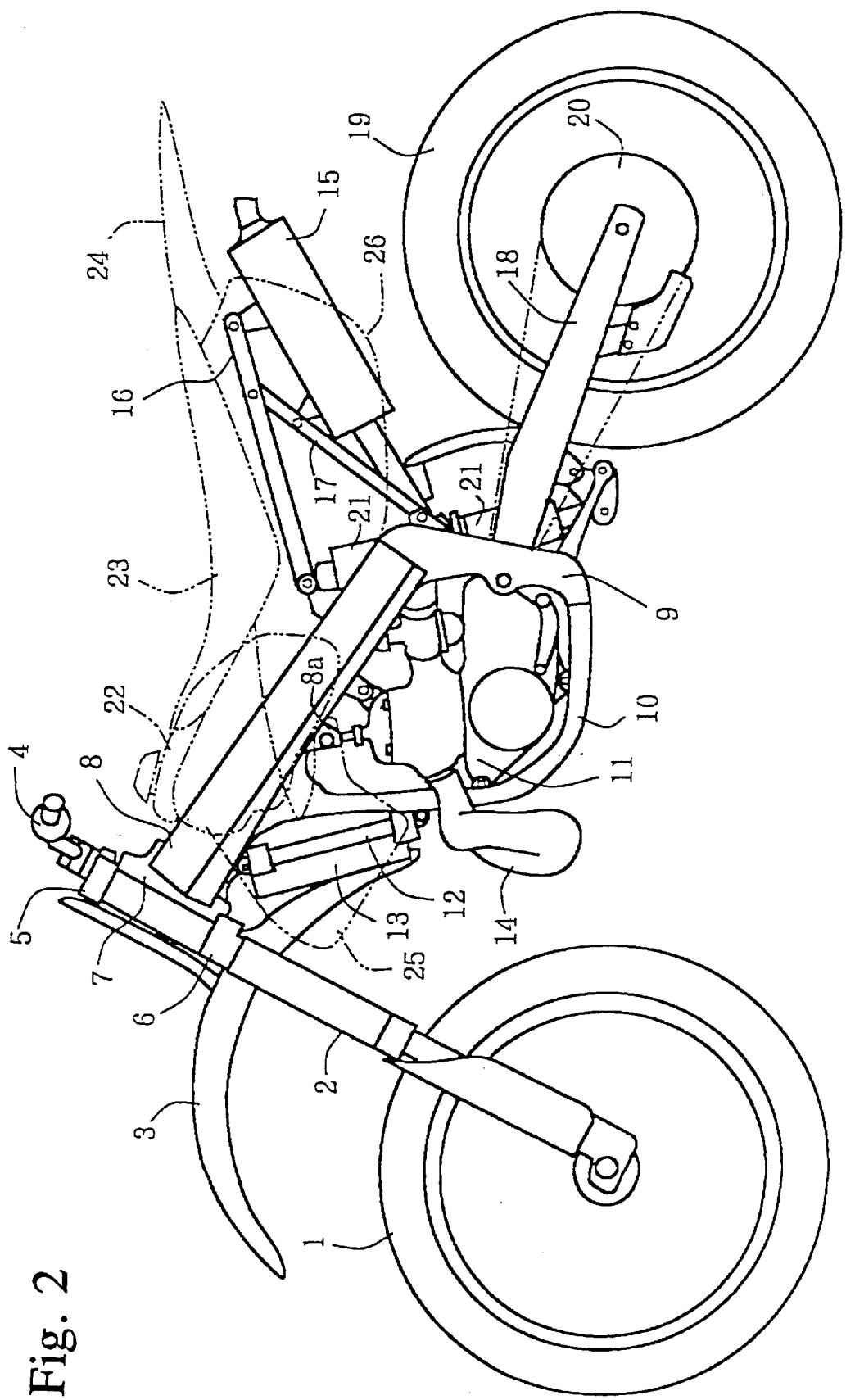
FIG. 2 is a side view of a skeleton of the motorcycle.

As more particularly shown in FIG. 2, the front wheel 1 is rotatably supported by the bottom ends of a pair of right and left front forks 2. A front fender 3 is mounted to a middle portion of the front forks 2, and a handles 4 are mounted at the top ends of the front forks 2.

The front forks 2 are rotatably supported by a head pipe 7 having a top bridge 5 and a bottom bridge 6 mounted thereto.

Figure 3:
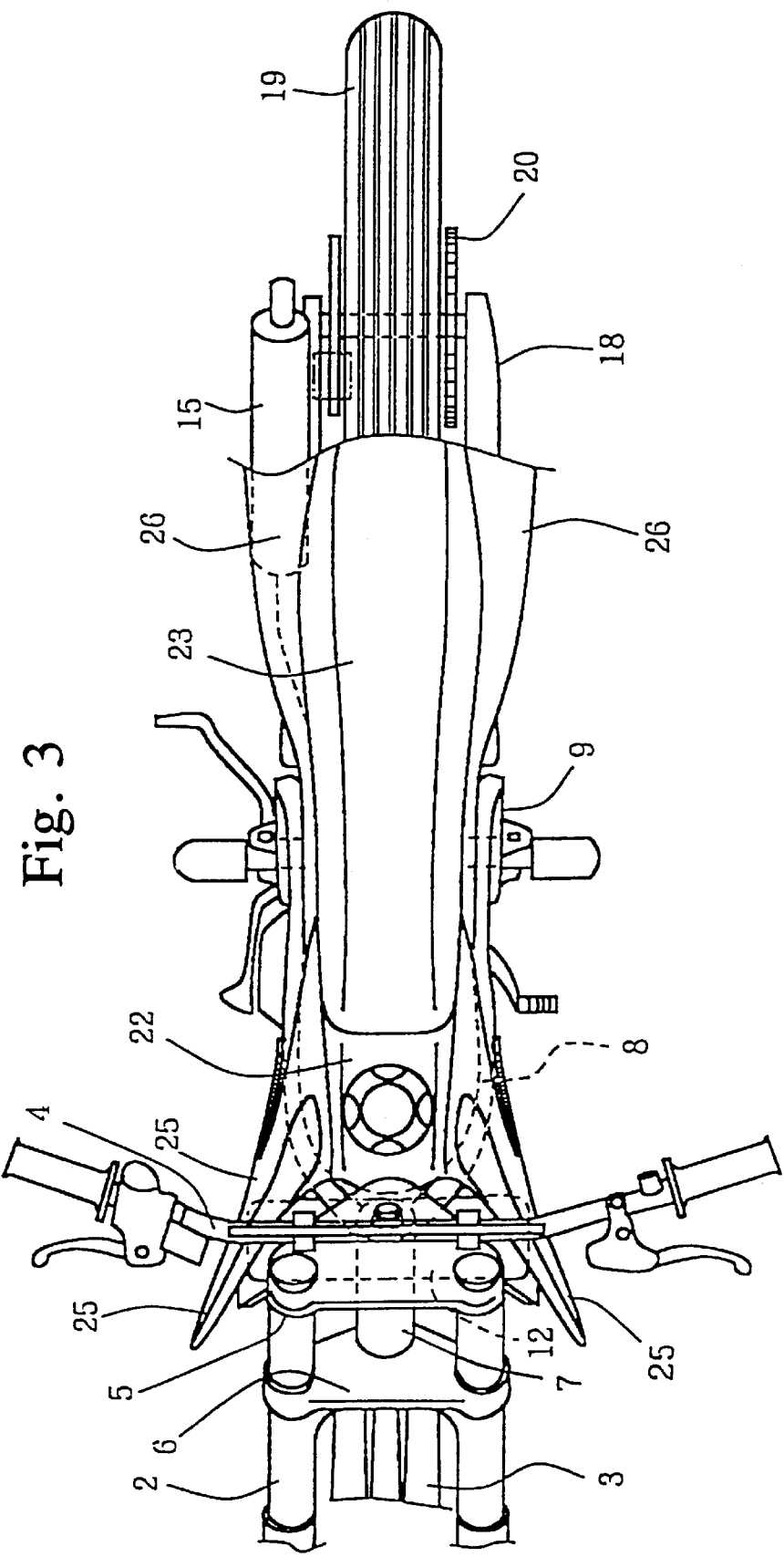
FIG. 3 is a partially cutaway, top plan view of the inventive motorcycle.

As shown in FIG. 3, the head pipe 7 is provided at the front end of a pair of right and left main frames 8 that widen in an outward direction as the main frames 8 extend in a backward direction.

As shown in FIG. 2, the rear ends of the main frames 8 are joined to a pair of right and left pivot frames 9 extending vertically. Furthermore, a pair of right and left lower frames 10 having an L-shape when viewed from the side are connected between the middle portions of the main frames 8 and the bottom ends of the pivot frames 9.

A water-cooled engine 11 is supported by the main frames 8, pivot frames 9, and lower frames 10. In the drawings, the engine 11 is a two-cycle engine, but the inventive concepts may also be applied to four-cycle, water cooled engines.

As shown in FIGS. 1 and 2, an exhaust pipe 14 connected to the exhaust port of the engine 11 extends backward and is connected to a muffler 15. The muffler 15 is supported by a seat rail 16 that extends backward. from the main frame 8 and a rear stay 17 that extends up and back from the pivot frame 9.

The front end of a rear swing arms 18 is swingably supported by the pivot frames 9. The rear end of the rear swing arms 18 supports a rear wheel 19, and a driven sprocket 20 is mounted on the side of the rear wheel 19.

Furthermore, a rear cushion unit 21, a fuel tank 22, a seat 23, and a rear fender 24 are arranged in a conventional manner as shown in the figures.

As shown in FIGS. 1 and 2, a radiator 12 is connected to the engine 11 and supported by the main frames 8 and lower frames 10. Furthermore, radiator 12 is mounted in front of the right and left lower frames 10.

Figure 6:
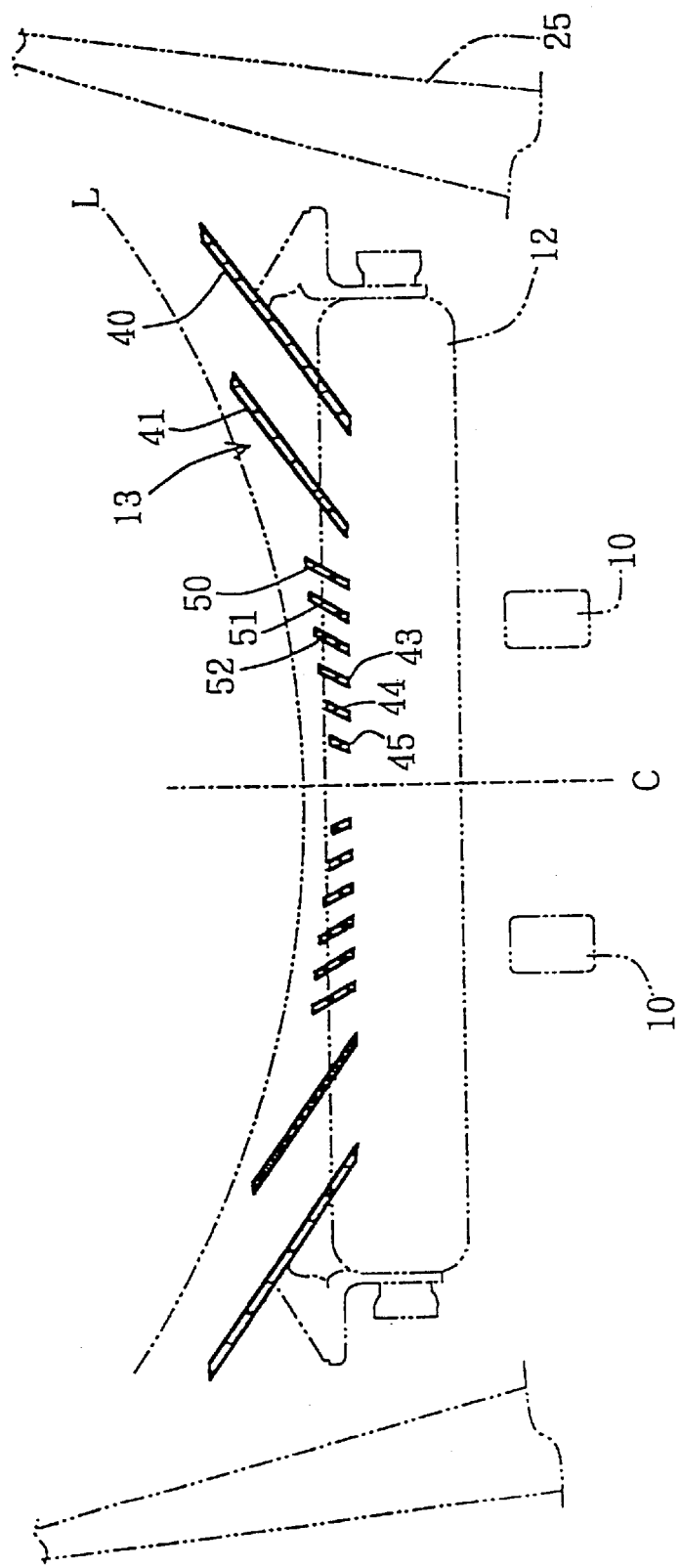
FIG. 6 is a partial cross-sectional view along the section line 6—6 in FIG. 1.

As is most apparent in FIG. 6, the radiator 12 has a monolithic structure laterally extending across the width of the motorcycle. A radiator grille 13 is mounted in front of the radiator 12.

As further shown in FIG. 6, the radiator grille 13 is symmetrically mounted with respect to the body center plane C. The radiator grille 13 includes louvers such as louvers 40, 41, 50, 51, 52, 43, 44 and 45 that are arranged along a circular arc such that the forwardly projecting ends of louvers that are located farther from the body center plane C project forward more than louvers located closer to the body center plane C. In other words, the louvers are arranged along the outside of the locus of rotation line L inscribed by the rear end of the front fender.

The motorcycle also has a body cover including a radiator shroud 25 for covering the sides of the radiator 12 and the fuel tank 22 and a side cover 26 for covering the right and left sides of the motorcycle body under the seat 23.

Figure 4:
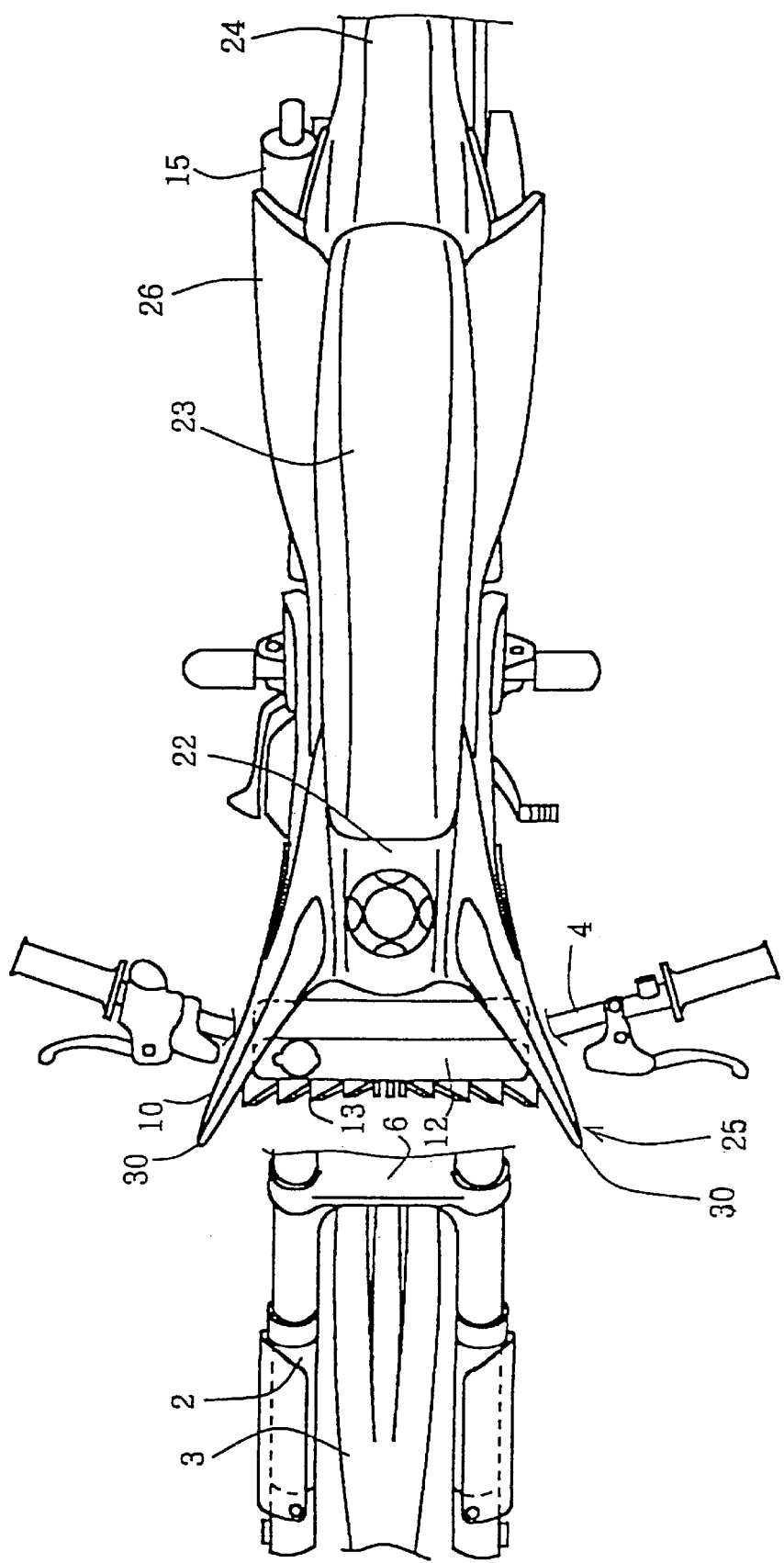
FIG. 4 is a partially cutaway, top plan view of the front portion of the inventive motorcycle.

As shown in FIG. 4, the radiator shroud 25 diverges as it extends in the forward direction so as to cover the right and left sides of the radiator 12 and grille 13. The radiator shroud 25 projects forward beyond the radiator 12.

When viewed from the side (FIG. 1) the radiator shroud 25 has a shape which approximates a triangle having a vertex 30, upper shroud portion 31 and lower shroud portion 32. The upper shroud portion 31 is inclined in a forward direction and the lower shroud portion 32 is inclined in a backward direction.

Figure 5:
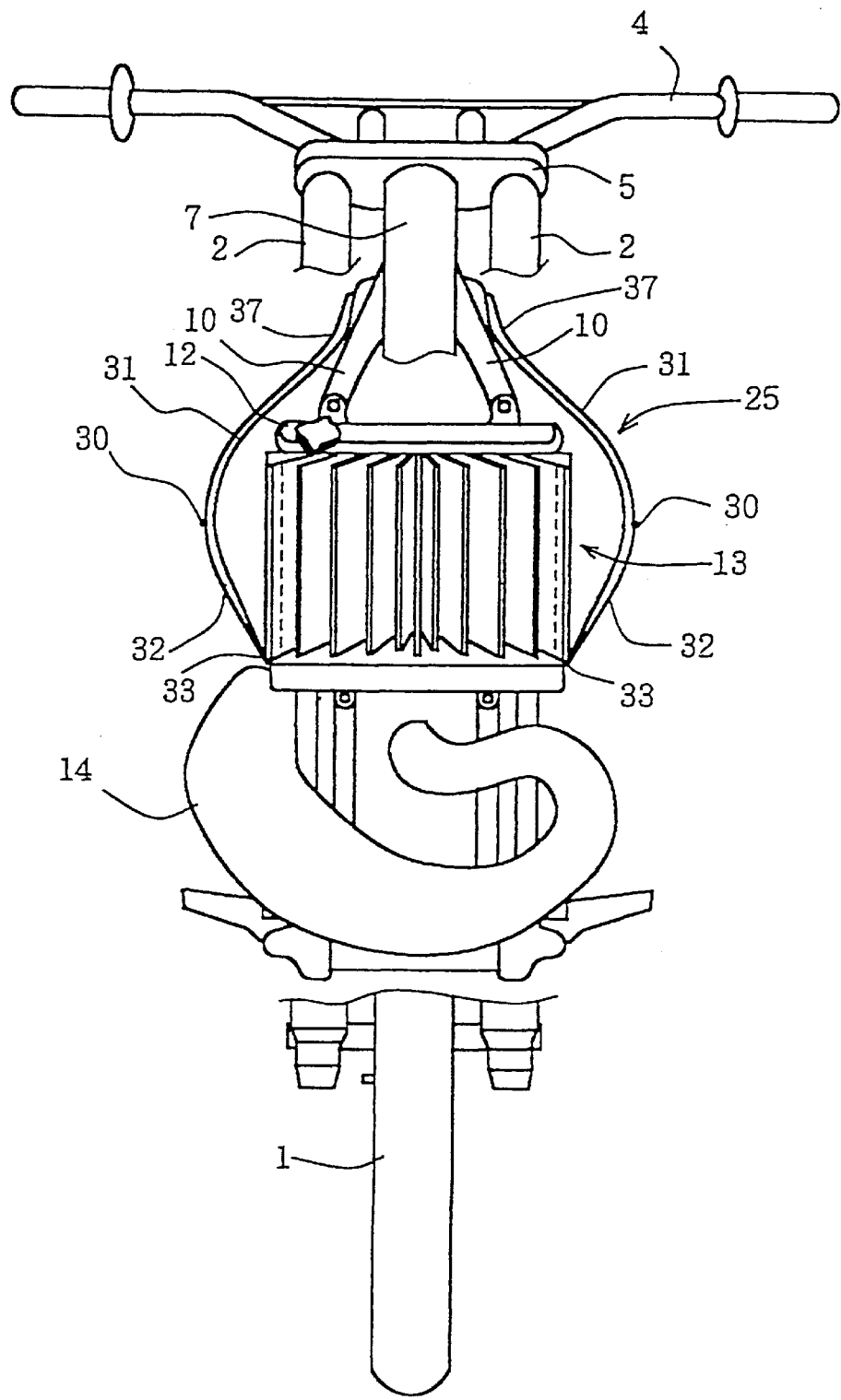
FIG. 5 is a partially cutaway, front view of the inventive motorcycle.

As shown in FIG. 5, the vertex 30 is positioned near the middle (vertical direction) of the radiator 12. The bottom end 33 of the lower shroud portion 32 approximately coincides with the bottom end of the radiator 12. As shown in FIG. 1, the shroud 25 and radiator 12 are connected with a bolt 34.

As is apparent in FIG. 5, the opening of the radiator shroud 25 surrounds the front end of the radiator 12 in a form approximating a circular arc wherein the vertices 30 of the opening occupy the outermost position of the shroud 25 in the lateral (left-right) direction.

As shown in FIG. 1, a backwardly extending portion 3S of the shroud 25 extends in a backwards direction from the bottom end 33 of the lower shroud portion 32. The backwardly extending portion 35 of the shroud 25 is mounted to a stay 8a (FIG. 2) that projects from the main frame 8 at the rear end thereof with a bolt 36.

As further shown in FIG. 1, an top portion 37 of the shroud 25 extending in a backward direction from the upper end of the upper shroud portion 31 is mounted at the top end thereof to the side of the fuel tank 22 with a bolt 38. An opening 39 for venting air is formed between the top portion 37 and backwardly extending portion 35.

Figure 7:
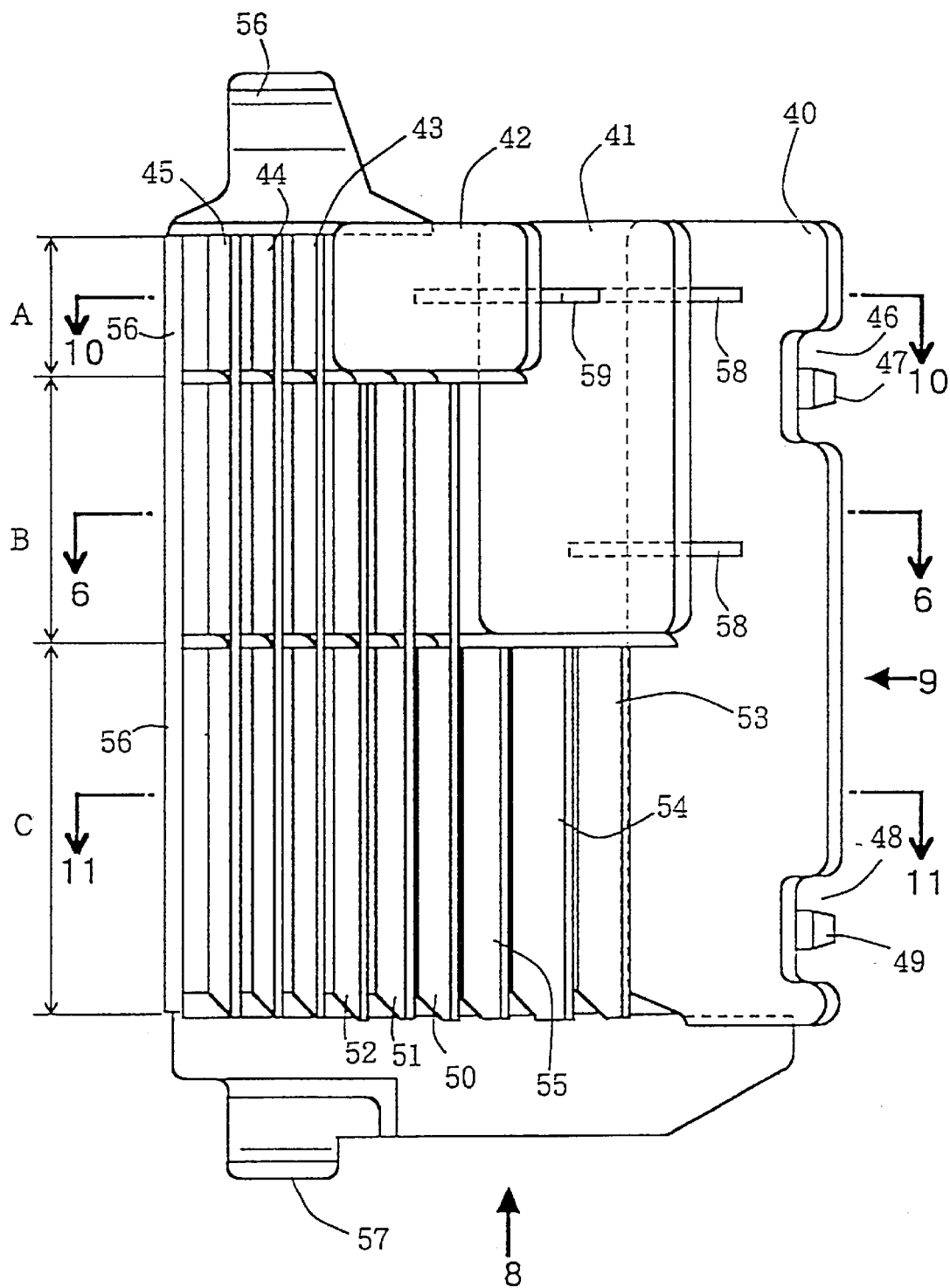
FIG. 7 is a front view of left half of the radiator grille according to the invention.
Figure 8:
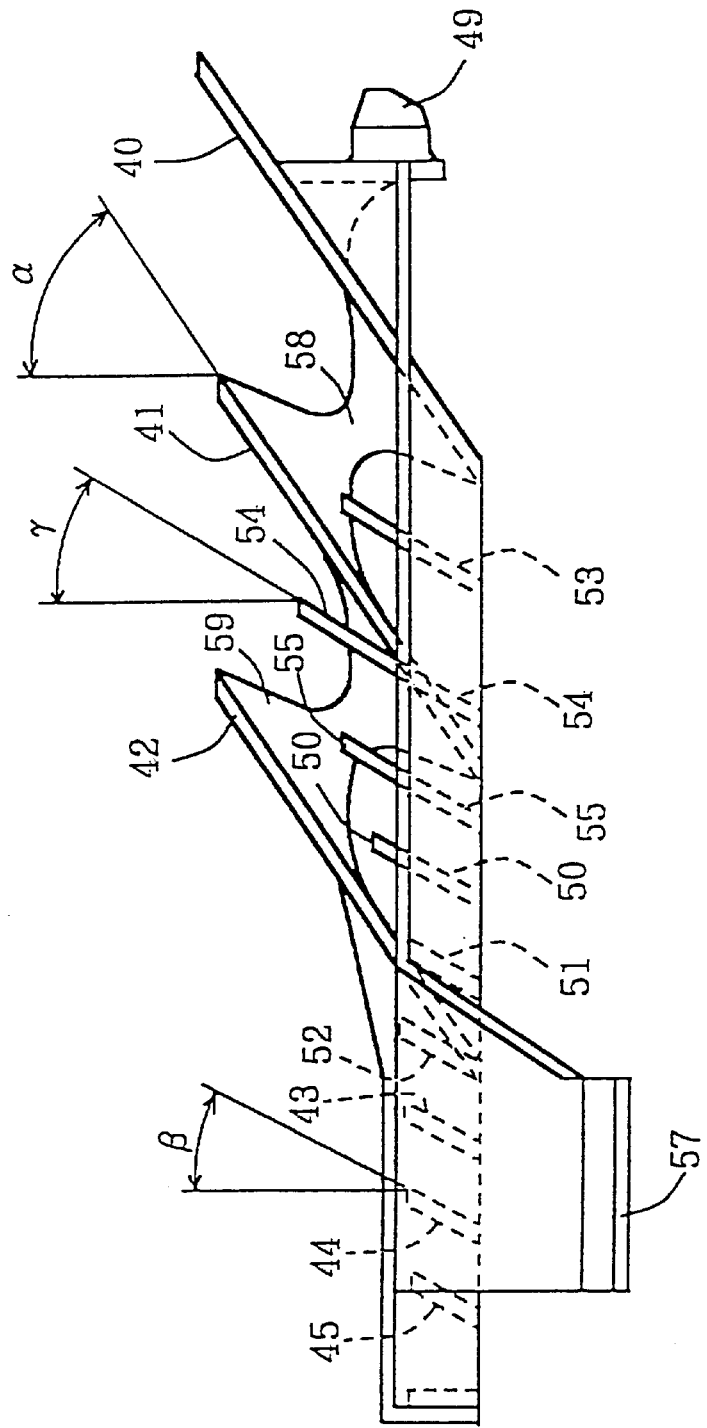
FIG. 8 is a bottom view of FIG. 7 (view from arrow 8 in FIG. 7)
Figure 9:
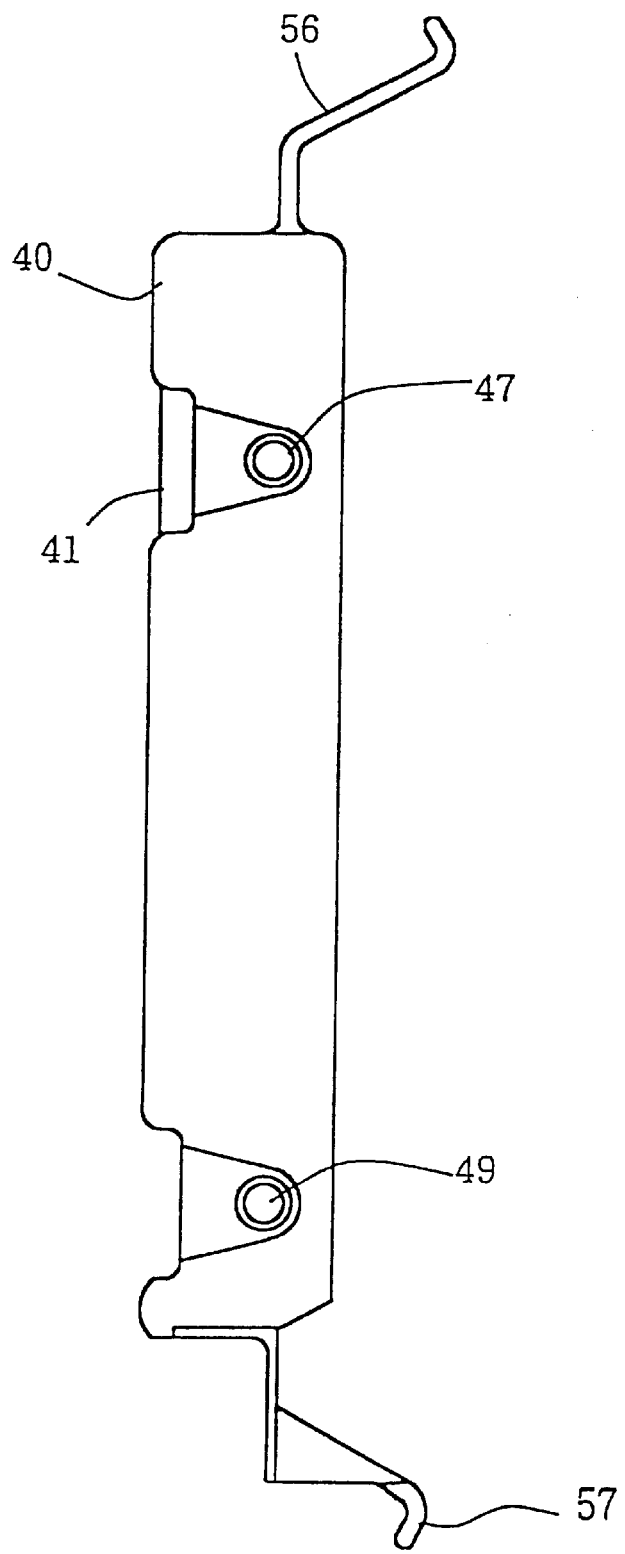
FIG. 9 is a side view of FIG. 7 (view from arrow 9 in FIG. 7)
Figure 10:
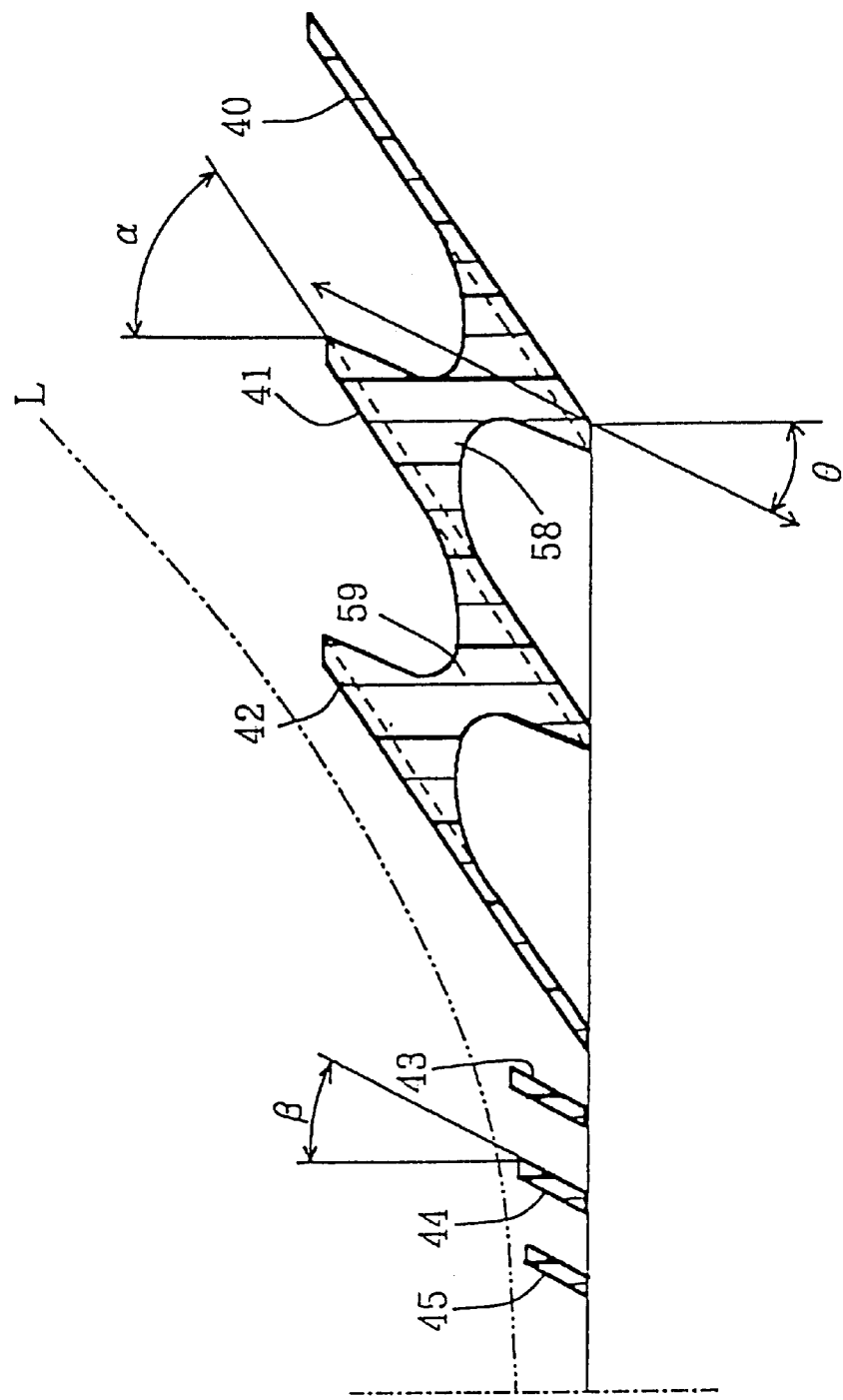
FIG. 10 is a cross-sectional view along the section line 10—10 in FIG. 7.
Figure 11:
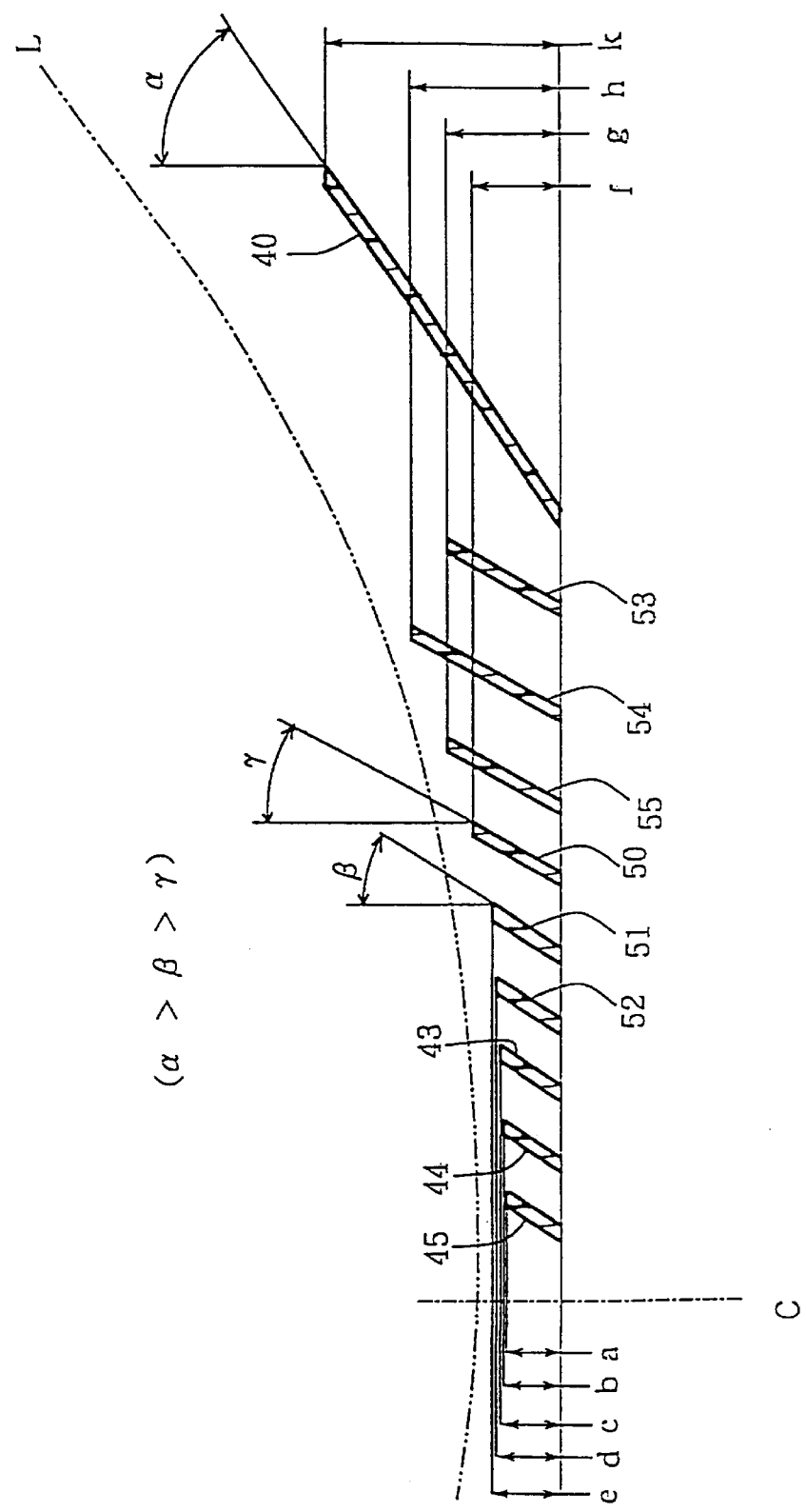
FIG. 11 is a cross-sectional view along the section line 11—11 in FIG. 7.

FIGS. 7–11 show the details of the radiator grille 13 by focussing on the left side of the grille 13 from various perspectives: FIG. 7 is a front view, FIG. 8 is a bottom view (view from the arrow 8 direction in FIG. 7), FIG. 9 is a side view (view from the arrow 9 in FIG. 7), FIG. 10 is a cross-sectional view along the section line 10—10 in FIG. 7, and FIG. 11 is a cross-sectional view along the section line 11—11 in FIG. 7.

As shown in FIG. 7, the radiator grille 13 includes; a plurality of louvers extending in a vertical direction. The radiator grill 13 is structured to forte three (A, B, C) sections located at the top, middle, and bottom, respectively. The top section A includes louvers 40–45 which are numbered in an order starting from the outboard side and working inboard.

The outermost louver 40 out of the louvers 40–45 has a unified structure spanning the top, middle, and bottom sections (A, B, and C). Recesses 46 and 48 area formed on the side of the outermost louver 40 at upper and lower positions, respectively. Stopper projections 47 and 48 are formed inside the recesses 46 and 48. The recesses 46 and 48 are engaged with engaging parts (not shown) which are provided at corresponding positions on the radiator 12, respectively.

The second louver 41 from the outside has a unified structure spanning the top and middle (A and B) sections as shown in FIGS. 10 and 6. Louver 42 has a structure which spans only the top section A.

Inside louvers 43–45 have a unified structure spanning the top, middle, and bottom sections (A, B, and C) as shown in FIGS. 10, 6 and 11.

As shown in FIG. 7, the middle section B further includes middle louvers 50, 51 and 52 having a unified structure spanning the middle and bottom sections (B and C) and which are formed under the louver 42.

FIG. 6 is a cross-sectional view of the middle section B taken along section line 6—6 which shows the arrangement of the various louvers in more detail.

As shown in FIG. 11, the bottom section C includes louvers 53, 54 and 55 which are formed between the outermost louver 40 and louver 50. Louvers 53, 54 and 55 span the bottom section C.

The louvers may also be grouped into a large wing structure including louvers 40, 41 and 42; a medium wing structure including louvers 53, 54, 55 and 50; and a small wing structure including louvers 51, 52, 43, 44 and 45.

As further shown in FIG. 10, the large wing structure including outboard louvers 40, 41 and 42 are parallel to each another and inclined relative to a vertical reference line V by an inclination angle $\alpha$ (the angle formed between a louver and the vertical reference line is referred to as the inclination angle hereinafter).

The small wing structure including the innermost louvers 43, 44 and 45 and louvers 51 and 52 is structured such that all the louvers in the small wing structure are mutually parallel and form the same inclination angle $\beta$ with respect to the vertical reference line V as shown in FIG. 11.

The medium wing structure including louvers 50, 55, 54 and 53 is structured such that all the louvers in the medium wing structure are mutually parallel and form the same inclination angle $\gamma$.

The inclination angle $\gamma$ of the medium wing structure is preferably smaller than angle $\beta$ of the small wing structure ($\gamma<\beta$). Furthermore, the inclination angle $\alpha$ (for the large wing structure) is the largest inclination angle ($\gamma<\beta<\alpha$)

As shown in FIGS. 8 and 10, the large wing structure including louvers 40, 41 and 42 projects in a forward direction and inclines outwardly more than all the other louvers. This large wing structure permits louvers 40, 41 and 42 to capture a large portion of air when the motorcycle is moving.

In other words, the streamlines which trace the direction of air movement when the motorcycle is moving are generally parallel to the body center plane C. Thus, the louvers 40, 41 and 42 form a large wing or scoop with a wide area extending outward to capture a large section of the airstream.

On the other hand, the innermost louvers 43, 44, 45; middle louvers 50, 51, 52 and louvers 53, 54 and 55 have a smaller inclination angle and a shorter forward projection than the louvers 40, 41 and 42 of the large wing structure so as not to interfere with the rear of the front fender 3 that is positioned in front of the radiator grille 13.

Because the rear of the front fender 3 has a shape in the form of circular arc curving towards the radiator grill 13; the top, middle, and bottom sections (A,B,C) of the radiator grille 13 are preferably structured to forwardly project by a progressively smaller distance from the top section A to the bottom section C and generally correspond to the respective, different rotation ranges of the front fender.

Accordingly, in the top section A, the louvers 43, 44 and 45 have the narrowest width. In contrast, a large wing including three louvers 40, 41 and 42 have the largest width.

The middle section of the small wing structure including six louvers 43, 44 and 45 and 50, 51 and 52 range wider. In contrast, the middle section B of the large wing structure includes only two louvers 40 and 41.

As further shown in FIG. 11, the forward projecting distance (a,b,c,d,e,f,g and h) increases gradually from the innermost louver 45 to the louver 54 (a<b<c<d<e<f<g<h).

The forward projection distance k for each of the outermost louvers 40, 41 and 42 of the large wing is significantly larger than the forward projection distance (a–h) for the each of the louvers of the small and medium wings.

The forward projection distance of boundary louver 53 (which is part of the medium wing structure and located at the boundary with the large wing structure) is approximately the same as the forward projection distance g of the louver 55 and is shorter than the forward projection h of the inside adjacent louver 54 (g<h).

If the boundary louver 53 of the medium wing projects too far forward, the forward end of boundary louver 53 will cover the opening between boundary louver 53 and adjacent louver 40. Covering this opening will block air flow into the radiator 12 and should, therefore, be avoided. The covering problem is resolved by adjusting the length of the boundary louver 53 as described above.

This covering problem may also occur at the between louver 50 and the louver 55. If the same inclination angle were utilized for each of these louvers, the increasing forward projection distance of the respective louvers would result in louver 50 covering the opening between louver 50 and the adjacent louver 55. To prevent this covering, the louver 50 and louvers 55,54 and 53 are constructed with a different inclination angles.

The angles $\beta$ and $\gamma$ are near rapping angle $\theta$ (FIG. 10). The rapping angle is a median value of angles $\beta$ and $\gamma$.

Approximately V-shaped stays 56 and 57 respectively project upwardly and downwardly from the middle of the top and bottom ends of the radiator grille 13. The radiator grille is mounted at the stays 56 and 57 to the radiator 12.

As shown in FIGS. 7, 8, and 10 are ribs 58 and 59 are formed between louvers 40 and 41 and between louvers 41 and 42 of the large wing.

The above description is directed to the left side of the radiator grill 13. The right side radiator grille 13 is symmetrical with respect to the left side, therefore, a detailed description thereof is omitted.

The radiator grille 13 including the above-described louvers is preferable formed as an integral, monolithic structure using a synthetic resin such as polypropylene.

Next, the operation of the invention will be described. The right and left radiator grilles 13 are mounted in front of the radiator 12, with the forwardly projecting ends of the respective louvers being located outside the rotation locus Line L inscribed by the rear end of the front fender 3.

In particular, as is apparent in FIGS. 10 and 11, because the small wing structure is arranged along approximate circular arc outside the rotation locus line L, the rear end of the front fender 3 does not interfere with the radiator grille 13 even if the grille 13 is provided in front of the radiator 12.

Accordingly, the existence of the radiator grille 13 does not influence on the wheel base. In other words, the same wheel base as that of a conventional motorcycle having no radiator grille can be realized with the invention.

The small wing structure is located at a position in which mud typically splashes from the front wheel 1. Splashing mud fouls the radiator and degrades ventilation and heat-exchange performance. Therefore, the vertically long small wing maintains radiator performance by preventing mud from splashing onto the radiator 13.

Further, because the outside louvers belonging to the large wing project outward to a significant extent and are outwardly inclined (larger inclination angle) more than the small wing, the quantity of intake air from the side is large which results in an enhanced ventilation effect.

Further, because the rear end of the front fender 3 has an arc shape that curves toward the radiator grille 13 as it extends downwardly the grille is structured to create a space that allows free rotation of the front fender 3 without interference with the front grill. More particularly, the forward projection distance of the respective louvers decreases in an order from the top, middle, and bottom sections (A, B, and C) to accommodate the arc shape of the front fender 3.

Figure 12:
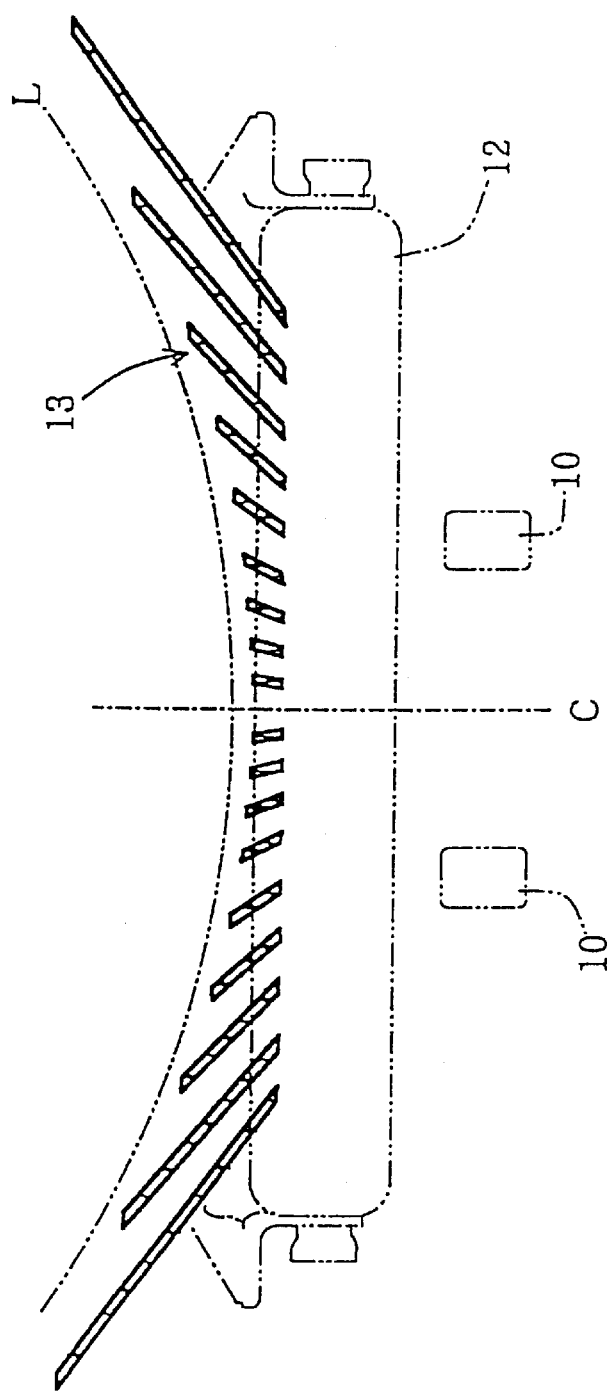
FIG. 12 is an alternative grille structure according to the invention.

FIG. 12 is a figure for describing an alternative construction for the invention with respect to corresponding FIG. 6.

As is apparent in FIG. 12, the respective louvers of the radiator grille 13 are progressively inclined away from the body center plane C. In other words, the inclination angle gradually increases from the inside louvers to the outside louvers. Furthermore, the forward projection distance gradually increases from the inside louvers to the outside louvers. More particularly, the forward ends of the louvers are arranged along the circular arc approximately outside the rotation locus line L inscribed by the front fender 3.

By structuring the radiator grill 13 as described above, a continuous change of inclination angle and forward projection distance for the respective louvers from the inside to the outside is simultaneously realized. As a result, the improved ventilation effect and prevention of splashed mud are both accomplished more consistently.

Such change in inclination angle and forward projection distance is not necessarily realized simultaneously. In other words, the continuous inclination angle increase and forward projection length increase may be utilized independently.

Figure 13:
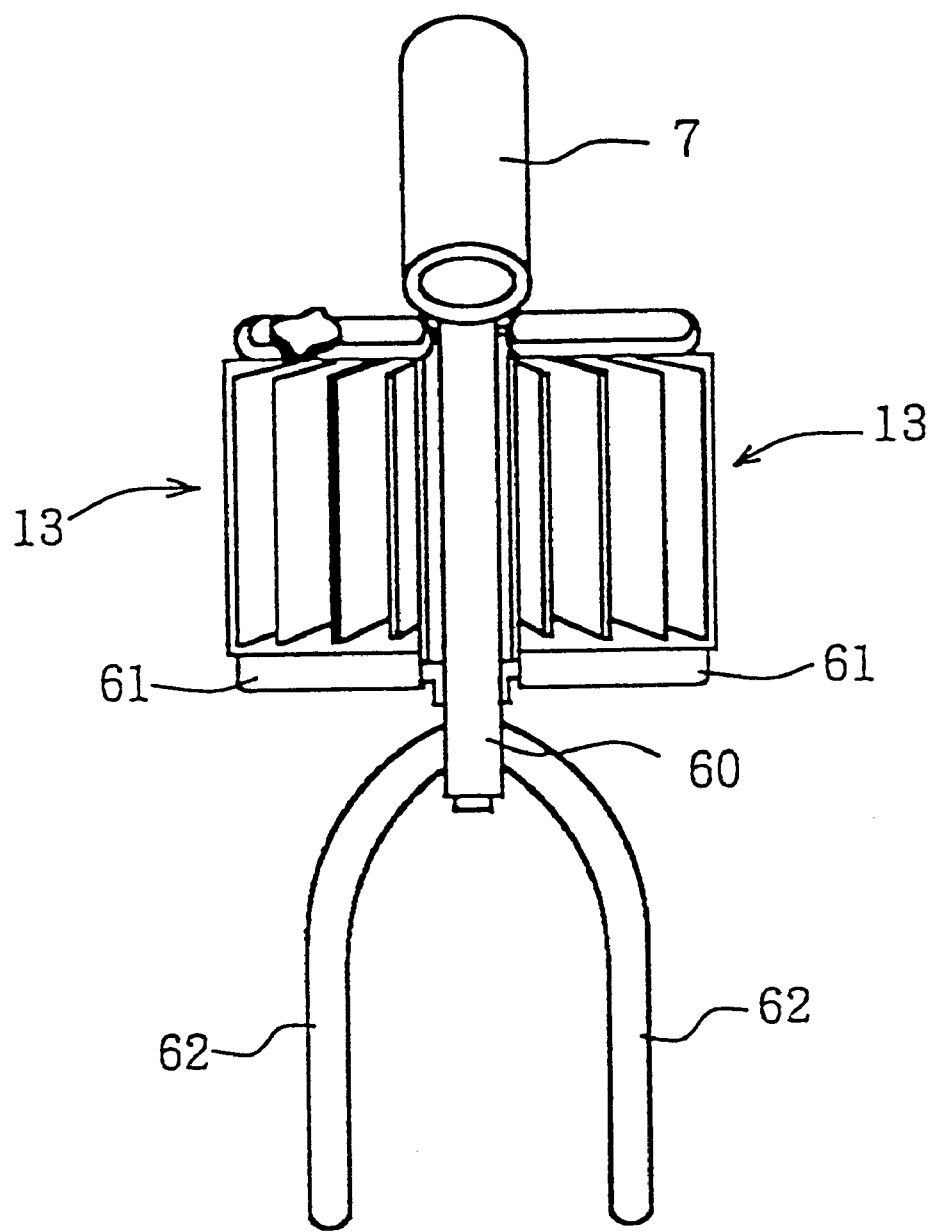
FIG. 13 is a front view of a radiator portion according to another alternative of the invention.

FIG. 13 is a front view of radiator portion according to another alternative of the invention. In this alternative, a separated or split-type of radiator 61 is supported on the right and left of a front down tube 60 extending backwardly and downwardly along the body center from the head pipe 7. A pair of right and left lower pipes 62 branching to the right and left at the bottom end of the front down tube 60 extend so as to pass under the engine.

In this alternative, however, the radiator grilles 13 that are described in detail above may still be utilized. Because the radiator grille 13 has a left-right symmetrical structure with respect to the body center plane C, the radiator grille 13 can be also used for such separated or split-type radiator 61.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A cooling device for a motorcycle, comprising:
   a radiator mounted behind a rotatable front fender;
   a radiator grille mounted in front of said radiator,
   said radiator grille including a plurality of louvers projecting forward from said radiator, wherein a forward projecting distance of said louvers is outside a rotation locus inscribed by a rear of the front fender,
   wherein said louvers are mounted with an inclination angle which outwardly inclines away from a body center plane of the motorcycle in a direction towards the rotatable front fender,
   wherein the inclination angle is larger for outboard louvers than for inboard louvers.

2. The cooling device for a motorcycle as recited in claim 1, wherein said radiator is symmetrically mounted to the motorcycle and has a monolithic structure that extends across a width direction of the motorcycle.

3. The cooling device for a motorcycle as recited in claim 1, wherein the forward projecting distance of said louvers continuously increases from inboard louvers to outboard louvers.

4. The cooling device for a motorcycle as recited in claim 1, wherein the inclination angle continuously increases from inboard louvers to outboard louvers.

5. The cooling device for a motorcycle as recited in claim 1, wherein the rear of the front fender appears to overlap with said radiator grille when viewed from the side.

6. The cooling device for a motorcycle as recited in claim 1, further comprising:
   a radiator shroud mounted to the motorcycle having a diverging structure which diverges as said radiator shroud forwardly extends,
   said radiator shroud having a substantially triangular shape when viewed from the side with a vertex of the triangular shape approximately coinciding with a middle portion of said radiator,
   said radiator shroud further including a substantially arc shaped opening wherein the vertex occupies an outermost position of said radiator shroud.

7. A radiator grille structure for a motorcycle having a radiator, a radiator grille mounted in front of the radiator, and a rotatable front fender mounted in front of the radiator grille, comprising:
   inner louvers located on an inner portion of the radiator grille, and
   outer louvers located on an outer portion of the radiator grille,
   said inner louvers having a width less than a width of said outer louvers such that said inner louvers have forward ends that project forward less than forward ends of said outer louvers, wherein the inner portion of the radiator grille is located closer to a body center plane of the motorcycle than the outer portion of the radiator grille.

8. The radiator grille structure for a motorcycle according to claim 7, said inner louvers having an inclination angle formed between said inner louvers and a vertical reference line which is less than an inclination angle formed between said outer louvers and the vertical reference line.

9. The radiator grille structure for a motorcycle according to claim 7, wherein an inclination angle formed between both of said inner and outer louvers and a vertical reference line gradually increases from the inner louvers to the outer louvers.

10. The radiator grille structure for a motorcycle according to claim 7, wherein a forward projecting distance of the forward ends of said inner and outer louvers gradually increases from the inner louvers to the outer louvers.

11. A radiator grille for a motorcycle having a radiator, a radiator grille mounted in front of the radiator, and a rotatable front fender mounted in front of the radiator grille, comprising:

a first wing structure forming a first inclination angle with respect to a body center plane of the motorcycle, a second wing structure forming a second inclination angle with respect to the body center plane of the motorcycle, said second wing structure mounted inboard with respect to said first wing structure, a third wing structure forming a third inclination angle with respect to the body center plane of the motorcycle, said third wing structure mounted inboard with respect to said second wing structure, wherein the first, second and third inclination angles are different and incline away from the body center plane, wherein the second inclination angle is smaller than the third inclination angle.

12. The radiator grille for a motorcycle according to claim 11, wherein the first inclination angle is larger than the second and third inclination angles.

13. The radiator grille for a motorcycle according to claim 11, wherein the first inclination angle is larger than the third inclination angle and the third inclination angle is larger than the second inclination angle.

14. The radiator grille for a motorcycle according to, claim 11, wherein the radiator grille has a top section, a middle section and a bottom section, said first wing structure including:
a first louver located outermost with respect to the body center plane having a structure spanning the top, middle, and bottom sections;
a second louver inboard from said first louver having a structure spanning the top and middle sections;
and a third louver inboard from said second louver having a structure spanning the top section.

15. The radiator grille for a motorcycle according to claim 11, wherein the radiator grille has a top section, a middle section and a bottom section, said second wing structure including a louver spanning the middle and bottom sections and a plurality of louvers spanning the bottom section.

16. The radiator grille for a motorcycle according to claim 15, wherein the louvers of said second wing structure project forward by a distance less than a forward projecting distance of said first wing structure.

17. The radiator grille for a motorcycle according to claim 11, wherein the radiator grille has a top section, a middle section and a bottom section;

said third wing structure including a plurality of louvers spanning the top, middle and bottom sections and a plurality of louvers spanning the middle and bottom sections.

18. The radiator grille for a motorcycle according to claim 17, wherein the louvers of said third wing structure project forward by a distance less than a forward projecting distance of said first wing structure.

19. A radiator grille for a motorcycle having a radiator, a radiator grille mounted in front of the radiator, and a rotatable front fender mounted in front of the radiator grille, comprising:

a first wing structure forming a first inclination angle with respect to a body center plane of the motorcycle, a second wing structure forming a second inclination angle with respect to the body center plane of the motorcycle, said second wing structure mounted inboard with respect to said first wing structure, a third wing structure forming a third inclination angle with respect to the body center plane of the motorcycle, said third wing structure mounted inboard with respect to said second wing structure, wherein the first, second and third inclination angles are different and incline away from the body center plane, wherein the second inclination angle is smaller than the third inclination angle, wherein a boundary louver in said second wing structure located at a boundary between said first and second wing structures projects forward by a distance less than a forward projecting distance of a next, inboard louver of said second wing structure.

20. A radiator grille for a motorcycle having a radiator, a radiator grille mounted in front of the radiator, and a rotatable front fender mounted in front of the radiator grille, comprising:

a first wing structure forming a first inclination angle with respect to a body center plane of the motorcycle, a second wing structure forming a second inclination angle with respect to the body center plane of the motorcycle, said second wing structure mounted inboard with respect to said first wing structure, a third wing structure forming a third inclination angle with respect to the body center plane of the motorcycle, said third wing structure mounted inboard with respect to said second wing structure, wherein the radiator grille has a top section, a middle section and a bottom section,
said first wing structure including:
a first louver located outermost with respect to the body center plane having a structure spanning the top, middle, and bottom sections;
a second louver inboard from said first louver having a structure spanning only the top and middle sections;
and a third louver inboard from said second louver having a structure spanning only the top section.

* * * * *